(12) United States Patent
Kaneko

(10) Patent No.: US 10,823,247 B2
(45) Date of Patent: Nov. 3, 2020

(54) ROTARY DAMPER

(71) Applicant: OILES CORPORATION, Minato-ku, Tokyo (JP)

(72) Inventor: Ryohei Kaneko, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 16/301,600

(22) PCT Filed: May 11, 2017

(86) PCT No.: PCT/JP2017/017958
§ 371 (c)(1),
(2) Date: Nov. 14, 2018

(87) PCT Pub. No.: WO2017/204000
PCT Pub. Date: Nov. 30, 2017

(65) Prior Publication Data
US 2019/0178326 A1 Jun. 13, 2019

(30) Foreign Application Priority Data

May 23, 2016 (JP) ................................. 2016-102690

(51) Int. Cl.
*F16F 9/14* (2006.01)
*F16F 9/44* (2006.01)
(52) U.S. Cl.
CPC ................ *F16F 9/145* (2013.01); *F16F 9/14* (2013.01); *F16F 9/44* (2013.01); *E05Y 2201/266* (2013.01)
(58) Field of Classification Search
CPC .... F16F 9/14; F16F 9/145; F16F 9/346; F16F 9/3465; F16F 9/44

(Continued)

(56) References Cited

U.S. PATENT DOCUMENTS

| 740,473 | A | * | 2/1903 | Scherer | .................. | F16F 9/145 |
| | | | | | | 188/310 |
| 1,735,769 | A | * | 11/1929 | Manzel | .................. | F16F 9/145 |
| | | | | | | 188/310 |

(Continued)

FOREIGN PATENT DOCUMENTS

| CN | 1102993 | 3/2003 |
| CN | 102146978 | 8/2013 |

(Continued)

OTHER PUBLICATIONS

Search Report issued in CN Appln. No. 201780028417.0 dated Feb. 2, 2020 (w/ translation).

*Primary Examiner* — Thomas J Williams
(74) *Attorney, Agent, or Firm* — Nixon & Vanderhye P.C.

(57) ABSTRACT

Provided is a rotary damper that makes it possible to easily adjust braking torque. A rotary damper that has a partitioning part and first and second adjustment bolts. The partitioning part has: first and second flow paths that connect regions of a partitioned cylindrical chamber; a first insertion hole that connects to the first flow path and to a first adjustment bolt screw hole of a case; and a second insertion hole that connects to the second flow path and to a second adjustment bolt screw hole of the case. The first adjustment bolt is screwed into the first adjustment bolt screw hole and is thereby inserted into the first insertion hole, and the length to which it protrudes into the first flow path can be adjusted. The second adjustment bolt is screwed into the second adjustment bolt screw hole and is thereby inserted into the second insertion hole, and the length to which it protrudes into the second flow path can be adjusted.

8 Claims, 10 Drawing Sheets

(58) Field of Classification Search
USPC .................................. 188/290, 293, 294, 310
See application file for complete search history.

(56) References Cited

U.S. PATENT DOCUMENTS

| | | | | |
|---|---|---|---|---|
| 1,820,971 A | * | 9/1931 | Gruenfeldt | F16F 9/145 |
| | | | | 188/288 |
| 1,889,354 A | * | 11/1932 | Fieldman | F16F 9/145 |
| | | | | 188/310 |
| 1,932,770 A | * | 10/1933 | Crowe | F16F 9/145 |
| | | | | 188/310 |
| 2,270,668 A | | 1/1942 | Davis | |
| 2,286,516 A | * | 6/1942 | Swanson | B64C 9/02 |
| | | | | 188/275 |
| 3,512,803 A | * | 5/1970 | Hines | B62D 53/0878 |
| | | | | 280/432 |
| 3,672,475 A | | 6/1972 | Nash | |
| 4,674,608 A | * | 6/1987 | Morris | B60G 15/06 |
| | | | | 188/290 |
| 4,926,984 A | * | 5/1990 | Pollitt | F16F 9/145 |
| | | | | 188/306 |
| 5,901,821 A | * | 5/1999 | Hanawa | F16F 9/52 |
| | | | | 188/277 |
| 6,154,924 A | | 12/2000 | Woo | |
| 2012/0252590 A1 | | 10/2012 | Yonezawa et al. | |
| 2019/0353219 A1 | * | 11/2019 | Kaneko | F16F 9/14 |
| 2020/0018374 A1 | * | 1/2020 | Kaneko | F16F 9/14 |

FOREIGN PATENT DOCUMENTS

| | | | | | |
|---|---|---|---|---|---|
| DE | 2327338 A1 | * | 12/1974 | | F16F 9/145 |
| FR | 362287 A | * | 6/1906 | | F16F 9/145 |
| FR | 364575 A | * | 8/1906 | | F16F 9/145 |
| FR | 693875 A | * | 11/1930 | | F16F 9/145 |
| GB | 341002 A | * | 1/1931 | | F16F 9/145 |
| JP | 49-32496 | | 8/1974 | | |
| JP | 63-145834 | | 6/1988 | | |
| JP | 7-301272 | | 11/1995 | | |
| JP | 11-508656 | | 7/1999 | | |
| JP | 2010-023528 | | 2/2010 | | |
| JP | 2012-197861 | | 10/2012 | | |
| JP | 5414563 | | 2/2014 | | |
| WO | WO 98/39543 | | 9/1998 | | |

\* cited by examiner

Fig.5
(A) 4a, 4b
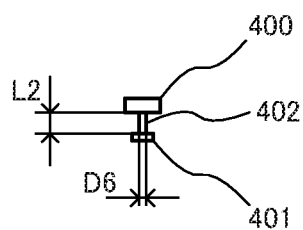
(B) 4a, 4b
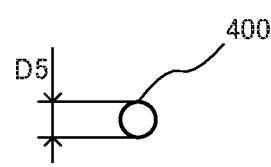
(C) 4a, 4b
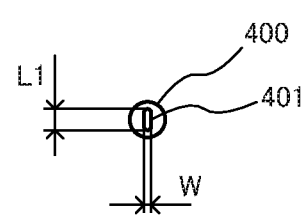

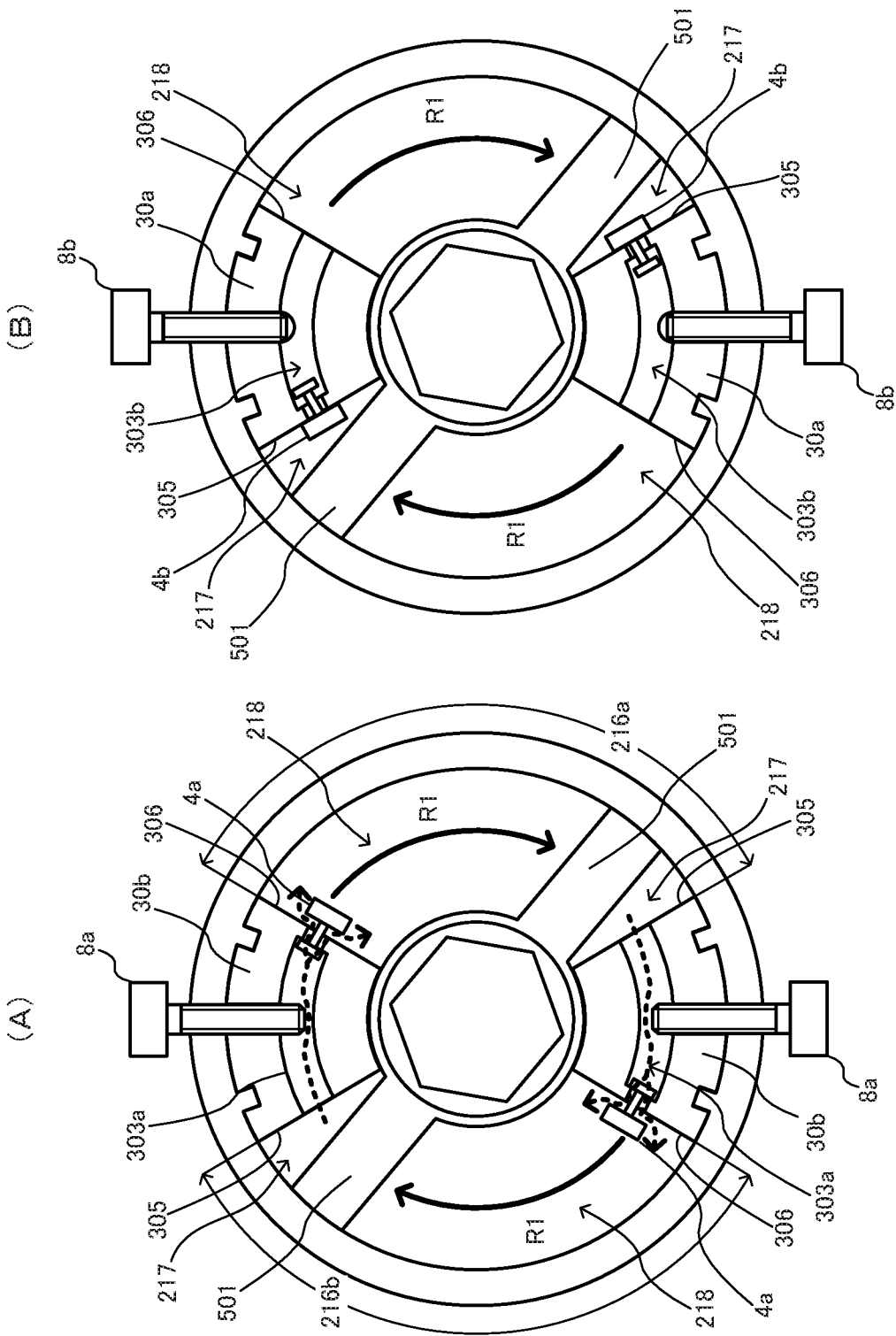

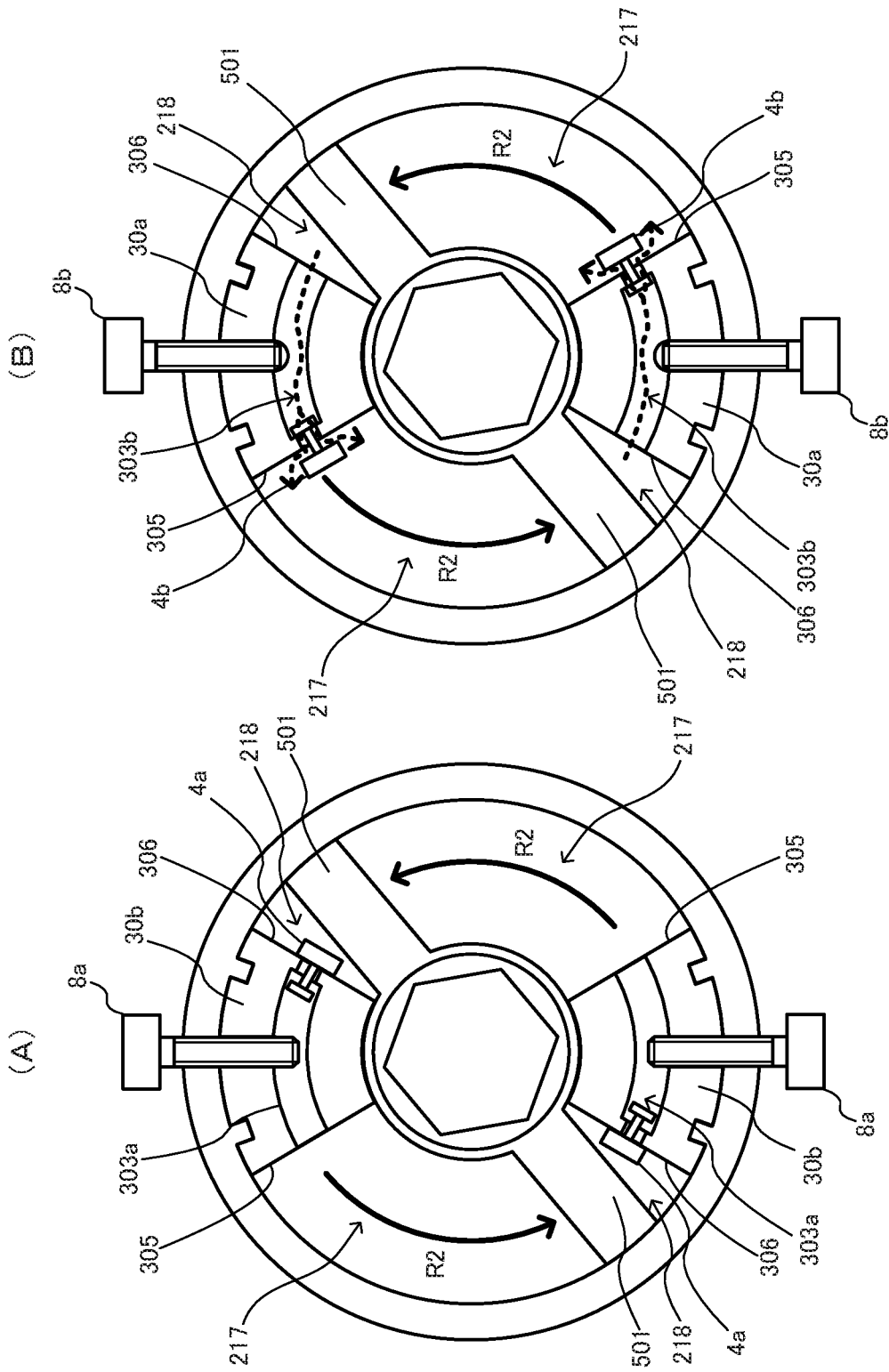

ROTARY DAMPER

This application is the U.S. national phase of International Application No. PCT/JP2017/017958 filed 11 May 2017 which designated the U.S. and claims priority to JP Patent Application No. 2016-102690 filed 23 May 2016, the entire contents of each of which are hereby incorporated by reference.

TECHNICAL FIELD

The present invention relates to a rotary damper, and in particular relates to a rotary damper that can adjust braking torque.

BACKGROUND ART

There is known a rotary damper that generates braking torque against applied rotating force. For example, the Patent Literature 1 discloses a rotary damper that is simple in structure and can be manufactured at low cost.

The rotary damper described in the Patent Literature 1 comprises: a case having a cylindrical chamber; a rotor received rotatably in the cylindrical chamber; viscous fluid filled in the cylindrical chamber; and a lid which is fixed to an open-side end surface of the case and confines the rotor together with the viscous fluid in the cylindrical chamber.

The rotor comprises: a rotor body of a cylindrical shape; and a vane formed to protrude outward in the radial direction from the outer peripheral surface of the rotor body so that a slight gap is formed between the vane and the inner peripheral surface of the cylindrical chamber. In the vane, a flow path is formed to run from one side surface (referred to as the first side surface) perpendicular to the rotation direction of the rotor to the other side surface (referred to as the second side surface). Further, a seal member is attached to an end surface (the surface facing the inner peripheral surface of the cylindrical chamber) of the vane so as to close the slight gap between the vane and the inner peripheral surface of the cylindrical chamber. This seal member has a check valve of elastic material for opening and closing the flow path formed in the vane. In the inner peripheral surface of the cylindrical chamber, a partitioning part is formed to protrude inward in the radial direction so that a slight gap is formed with the outer peripheral surface of the rotor body.

In the rotary damper described in the Patent Literature 1 of the above-described configuration, when force to rotate the rotor in the direction (first rotation direction) from the first side surface of the vane toward the second side surface is applied to the rotor, the viscous fluid in the cylindrical chamber presses the check valve against the second side surface of the vane, so that the check valve closes the flow path. Accordingly, movement of the viscous fluid is limited only to movement through the gap between the partitioning part of the cylindrical chamber and the outer peripheral surface of the rotor body and a gap between the closed-side end surface (bottom surface) of the case and the lower surface (surface facing the closed-side end surface of the case) of the vane. As a result, the pressure on the viscous fluid on the side of the second side surface of the vane is increased, and strong braking torque is generated. On the other hand, when force to rotate the rotor in the direction (second rotation direction) from the second side surface of the vane toward the first side surface is applied to the rotor, the viscous fluid on the side of the first side surface of the vane flows into the flow path and pushes up the check valve, to release the flow path. Thus, movement of the viscous fluid occurs also through the flow path formed in the vane, and therefore the pressure on the viscous fluid on the side of the first side surface of the vane is not increased and, as a result, weak braking torque is generated.

Further, the rotary damper described in the Patent Literature 1 is provided with a braking force adjustment mechanism for adjusting the large braking torque which is generated when force to rotate the rotor in the first rotation direction is applied to the rotor. This braking force adjustment mechanism comprises: an elastic member positioned between the open-side end surface of the case and the lid; and a plurality of bolts for fixing the lid to the open-side end surface of the case via the elastic member. A plurality of screw holes are formed in the open-side end surface of the case, and through-holes are formed in the elastic body and the lid at the positions corresponding to these screw holes. Each of the plurality of bolts is inserted into a through-hole of the lid and a through-hole of the elastic member, and screwed into a screw hole formed in the open-side end surface of the case. By the degree of fastening of the plurality of bolts, the length of the rotor pushed into the cylindrical chamber of the case by the lid is adjusted. As a result, the gap between the closed-side end surface of the case and the lower surface of the vane is adjusted. By this, it is possible to adjust the large braking torque generated when force to rotate the rotor in the first rotation direction is applied to the rotor.

CITATION LIST

Patent Literature

Patent Literature 1: Japanese Unexamined Patent Application Laid-Open No. H07-301272

SUMMARY OF INVENTION

Technical Problem

However, since the braking force adjustment mechanism of the rotary damper described in the Patent Literature 1 has the elastic member positioned between the open-side end surface of the case and the lid and has the plurality of bolts for fixing the lid to the open-side end surface of the case via the elastic member, it is necessary to equalize the respective degrees of fastening of the plurality of bolts so that the pushed-in length of the rotor by the lid becomes uniform over the whole surface of the lid. This makes adjusting work of braking torque troublesome.

The present invention has been made taking the above conditions into consideration, and an object of the present invention is to provide a rotary damper that can adjust braking torque easily.

Solution to Problem

To solve the above problems, according to the present invention, a flow path that connects regions partitioned by a partitioning part in a cylindrical chamber is formed in the partitioning part, and an insertion hole piercing a side wall (inner surface) of the flow path and the outer peripheral surface of a case is formed. Further, the present invention provides an adjustment means which is inserted into the insertion hole, with the protrusion length of the adjustment means into the flow path being adjustable while closing the insertion hole.

For example, the present invention provides a rotary damper for generating braking torque against applied rotating force by limiting movement of viscous fluid, comprising:

a case which has: a cylindrical chamber filled with the viscous fluid; and a fan-shaped partitioning part provided along a center line of the cylindrical chamber, with an inner peripheral surface of the partitioning part being directed inward in a radial direction, to partition an inside of the cylindrical chamber;

a rotor which has: a rotor body received in the cylindrical chamber rotatably relative to the cylindrical chamber, so that an outer peripheral surface of the rotor body is close to the inner peripheral surface of the partitioning part; and a vane formed along the center line of the cylindrical chamber, to protrude outward in a radial direction from an outer peripheral surface of the rotor body, so that an end surface of the vane is close to an inner peripheral surface of the cylindrical chamber;

a lid which is fixed to an opening part of the cylindrical chamber, to confine the rotor together with the viscous fluid in the cylindrical chamber;

a first flow path which is provided in the partitioning part and connects regions in the cylindrical chamber partitioned by the partitioning part;

a first insertion hole which pierces a side wall of the first flow path and an outer peripheral surface of the case; and a first adjustment means which is inserted into the first insertion hole and can change a protrusion length into the first flow path while closing the first insertion hole.

Advantageous Effects of Invention

According to the present invention, it is possible to adjust the flow rate of the viscous fluid flowing in the flow path by changing the protrusion length of the adjustment means into the flow path, so as to adjust movement of the viscous fluid between the regions in the cylindrical chamber partitioned by the partitioning part in which the flow path is formed. Accordingly, the present invention can adjust the braking torque easily.

BRIEF DESCRIPTION OF DRAWINGS

FIGS. 5(A)-5(C) are respectively a front view, a top view, and a bottom view of a first check valve 4a and a second check valve 4b;

FIGS. 9(A) and 9(B) are views for explaining the operating principle when the rotary damper 1 rotates in a first rotation direction R1; and FIGS. 10(A) and 10(B) are views for explaining the operating principle when the rotary damper 1 rotates in a second rotation direction R2.

DESCRIPTION OF EMBODIMENTS

Figure 1:
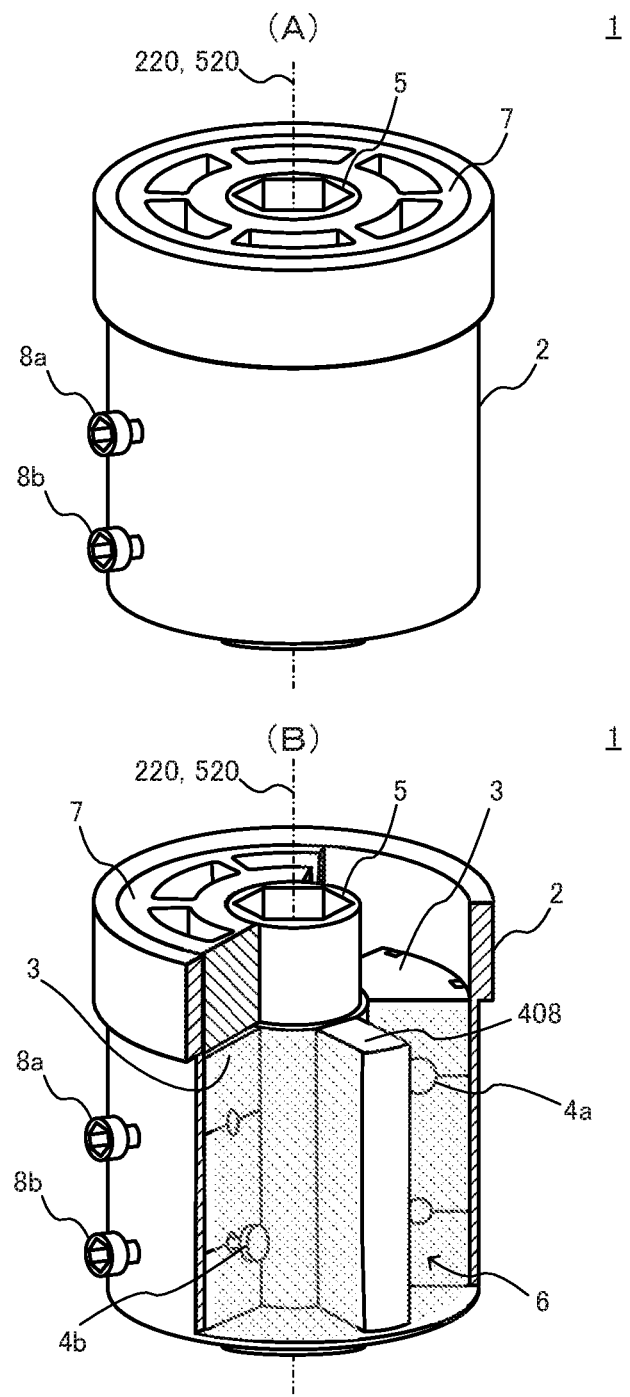
FIGS. 1(A) and 1(B) are respectively an external view and a partial cross-section showing schematic configuration of a rotary damper 1 according to an embodiment of the present invention.

In the following, one embodiment of the present invention will be described referring to the drawings.

Figure 2:
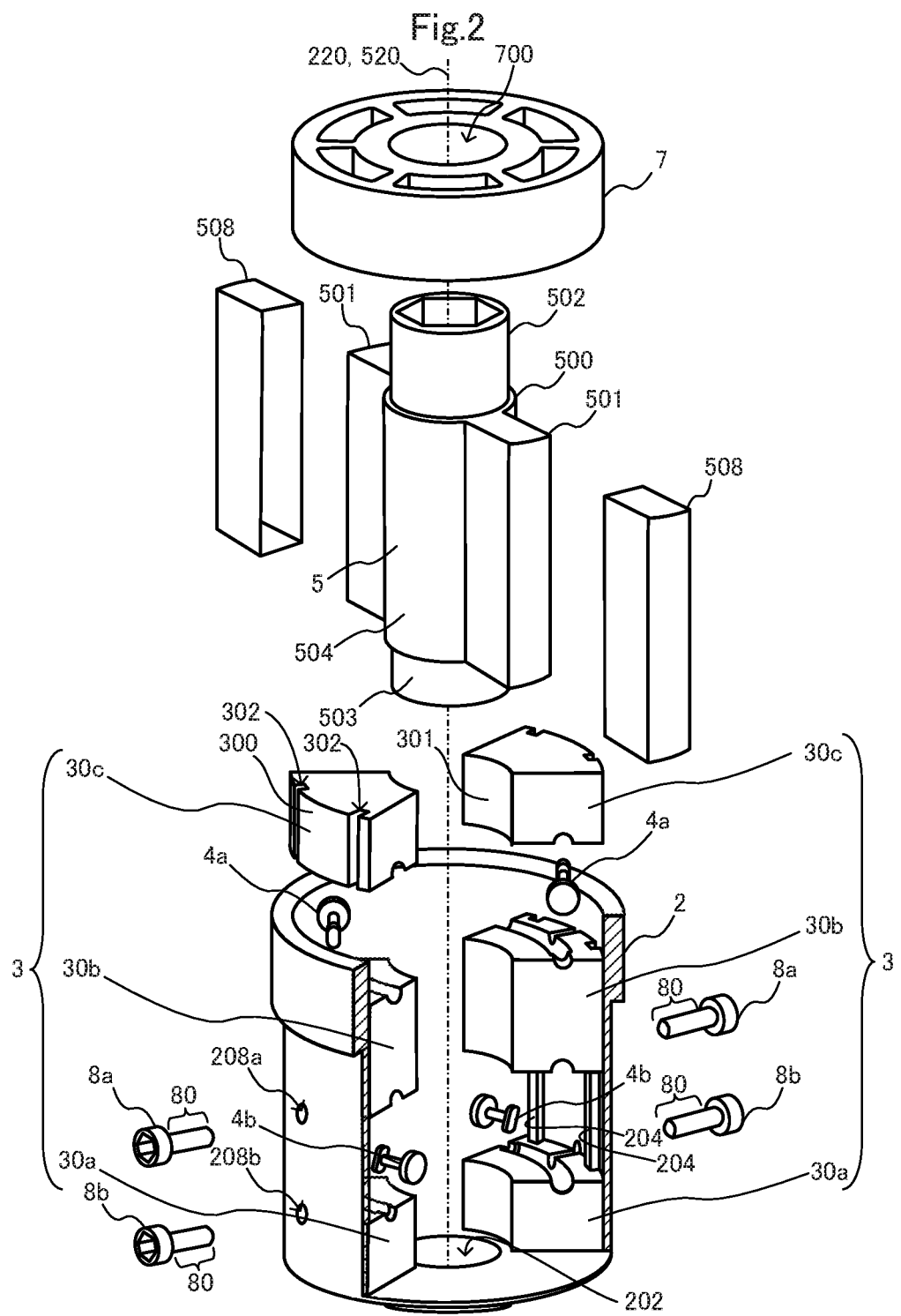
FIG. 2 is an exploded view of the rotary damper of an embodiment according to the present invention.

FIGS. 1(A) and 1(B) are respectively an external view and a partial cross-section view showing schematic configuration of a rotary damper 1 according to the present embodiment, and FIG. 2 is an exploded view of the rotary damper 1 according to the present embodiment.

As shown in the figures, the rotary damper 1 of the present embodiment comprises a case 2, a pair of partitioning parts 3, a pair of first check valves 4a, a pair of second check valves 4b, a rotor 5, viscous fluid 6 such as oil or silicone filled in the case 2, a lid 7, a pair of first adjustment bolts 8a, and a pair of second adjustment bolt 8b.

The case 2 receives the pair of partitioning parts 3 each of which is fitted with a first check valve 4a and a second check valve 4b, and the rotor 5, together with the viscous fluid 6.

Figure 3:
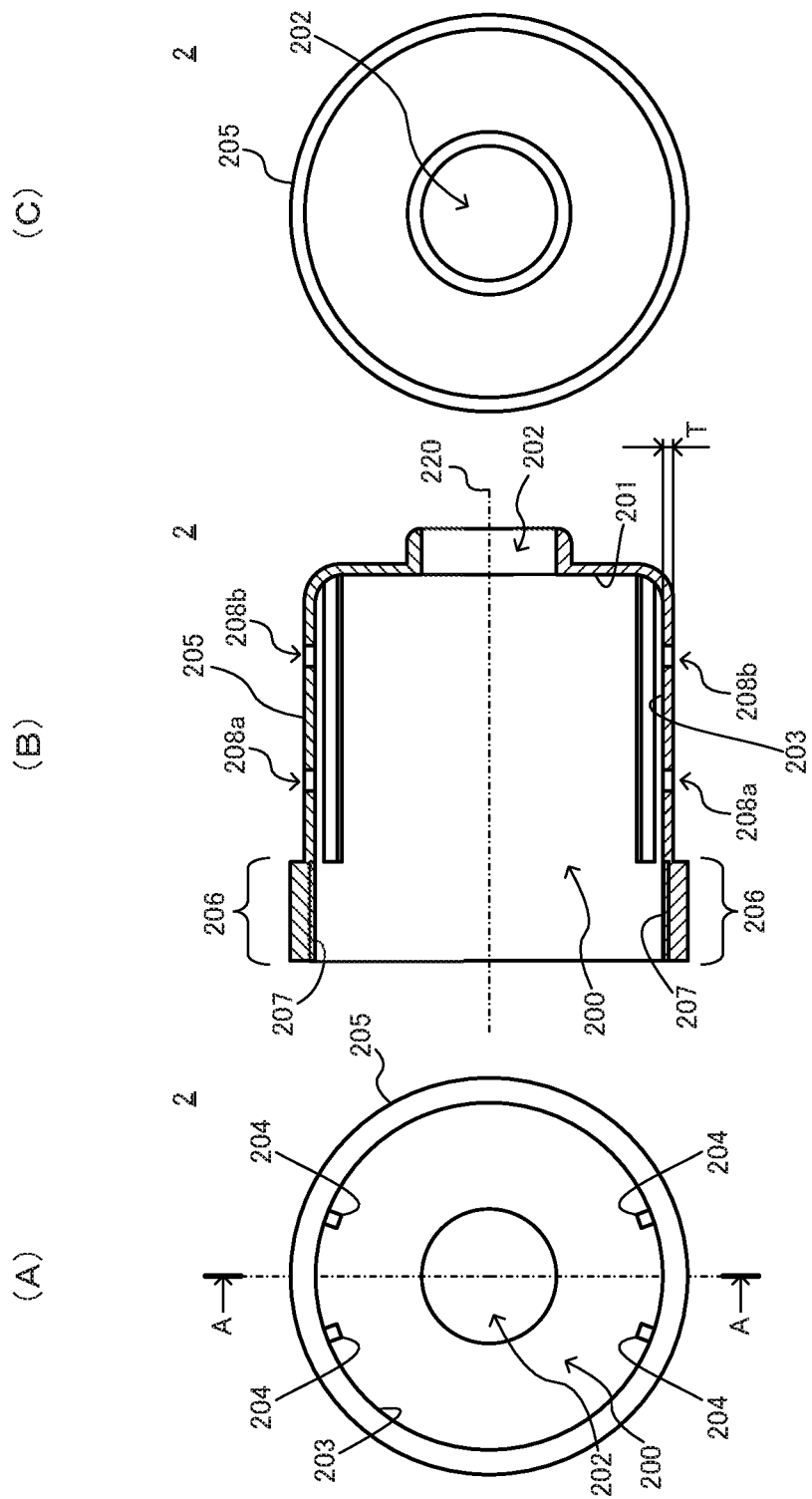
FIG. 3(A) is a front view of a case 2.
FIG. 3(B) is an A-A cross-section view of the case 2 shown in FIG. 3(A)
FIG. 3(C) is a back view of the case 2.

FIG. 3(A) is a front view of the case 2, FIG. 3(B) is an A-A cross-section view of the case 2 shown in FIG. 3(A), and FIG. 3(C) is a back view of the case 2.

As shown in the figures, a cylindrical chamber (a space of a bottomed cylinder shape) 200 which is opened at one end is formed in the inside of the case 2. On the inner peripheral surface 203 of the cylindrical chamber 200, for each partitioning part 3, a pair of positioning projections 204 are formed along the center line 220 of the cylindrical chamber 200. Each partitioning part 3 is received in the cylindrical chamber 200 of the case 2, in a state of being positioned by the pair of positioning projections 204 corresponding to that partitioning part 3.

Figure 4:
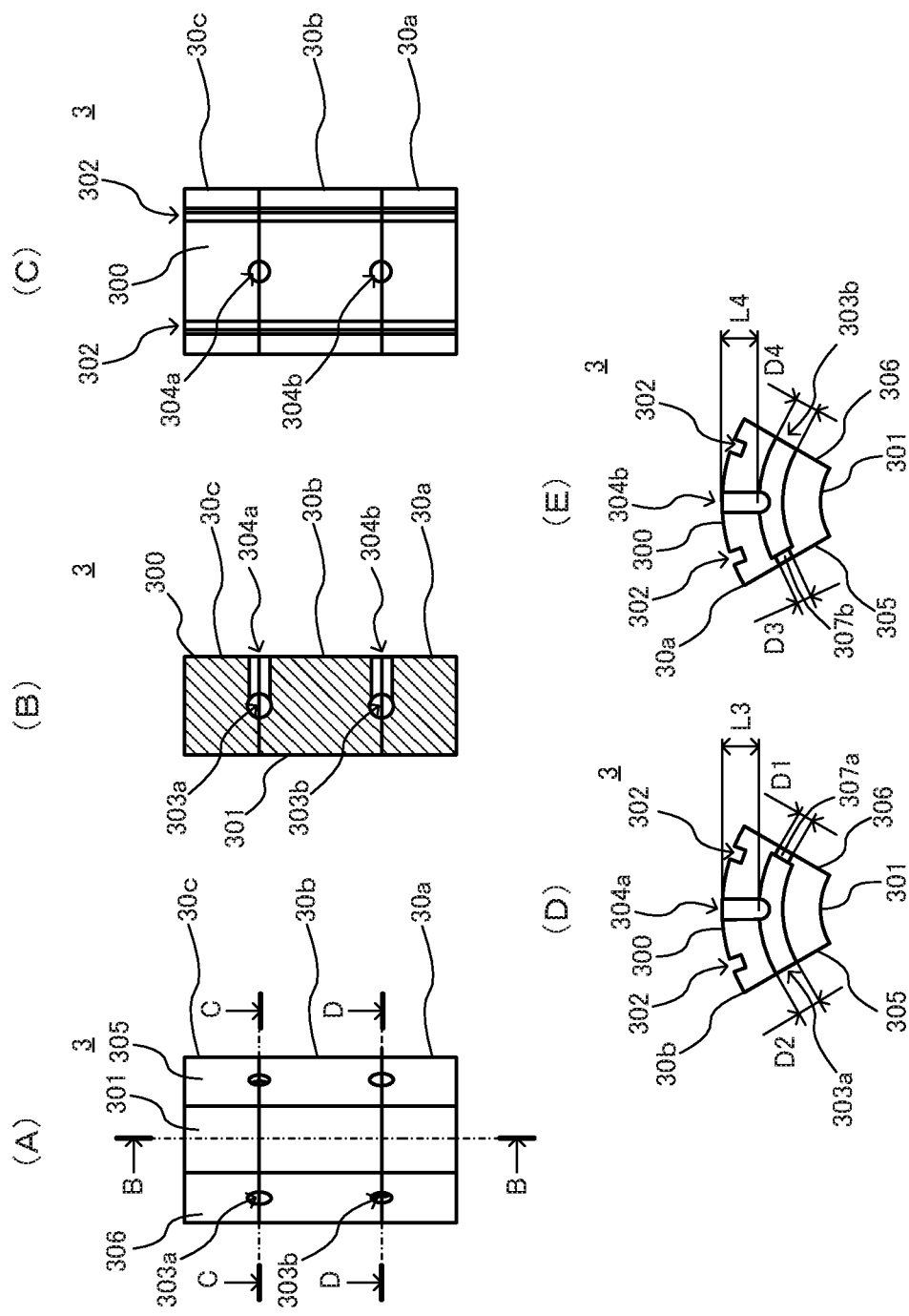
FIG. 4(A) is a front view of a partitioning part 3.
FIG. 4(B) is a B-B cross-section view of the partitioning part 3 shown in FIG. 4(A)
FIG. 4(C) is a back view of the partitioning part 2.
FIG. 4(D) is a C-C cross-section view (a top view of a partition block 30b) of the partitioning part 3 shown in FIG. 4(A)
FIG. 4(E) is a D-D cross section view (a top view of a partition block 30a) of the partitioning part 3 shown in FIG. 4(A)

Further, in the cylindrical chamber 200, a pair of first adjustment bolt screw holes 208a which pierce the inner peripheral surface 203 and the outer peripheral surface 205, are formed at positions of about the same height as that of the below-mentioned first flow paths 303a (See FIG. 4) of the pair of partitioning parts 3 received in the cylindrical chamber 200. Similarly, in the cylindrical chamber 200, a pair of second adjustment bolt screw holes 208b which pierce the inner peripheral surface 203 and the outer peripheral surface 205, are formed at positions of about the same height as that of the below-mentioned second flow paths 303b (See FIG. 4) of the pair of partitioning parts 3 received in the cylindrical chamber 200.

Figure 7:
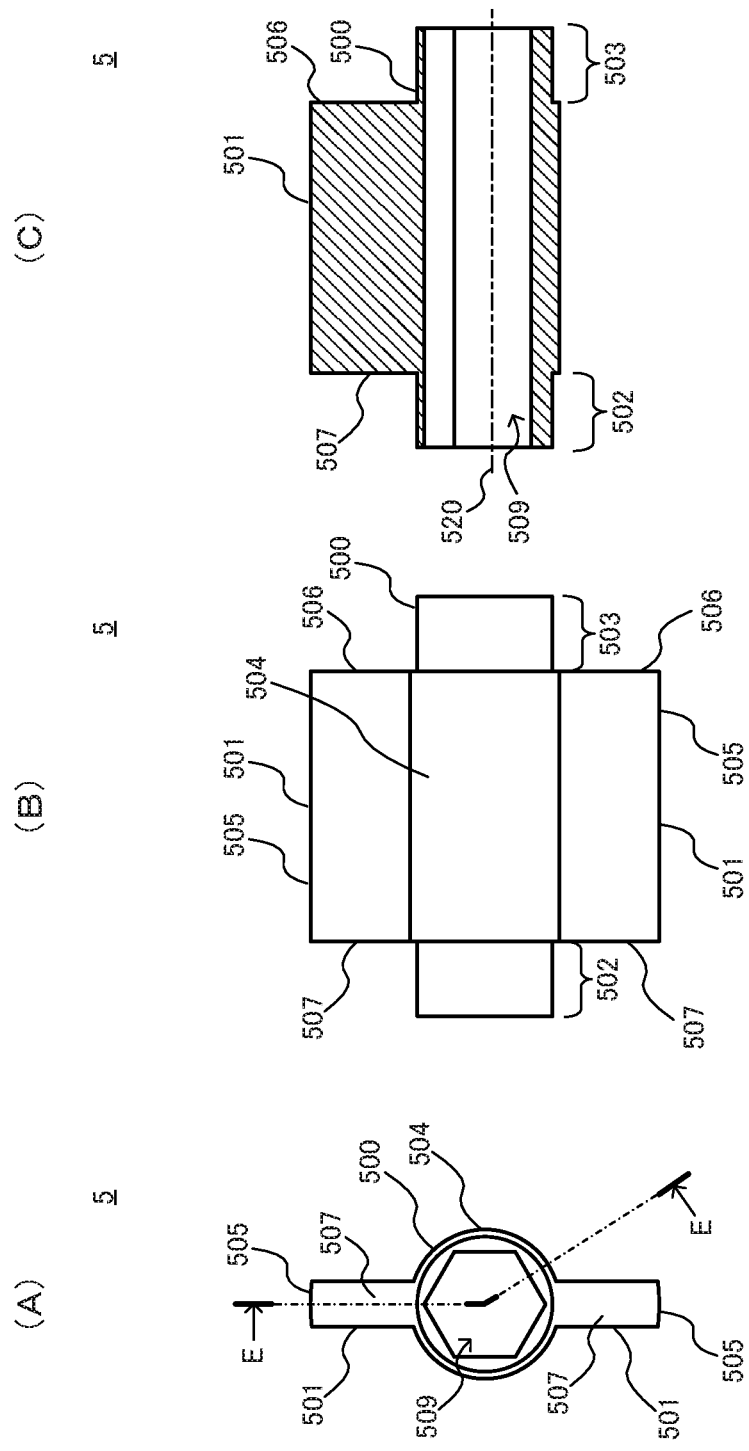
FIGS. 7(A) and 7(B) are respectively a front view and a side view of a rotor 5.
FIG. 7(C) is an E-E cross-section view of the rotor 5 shown in FIG. 7(A)
Figure 8:
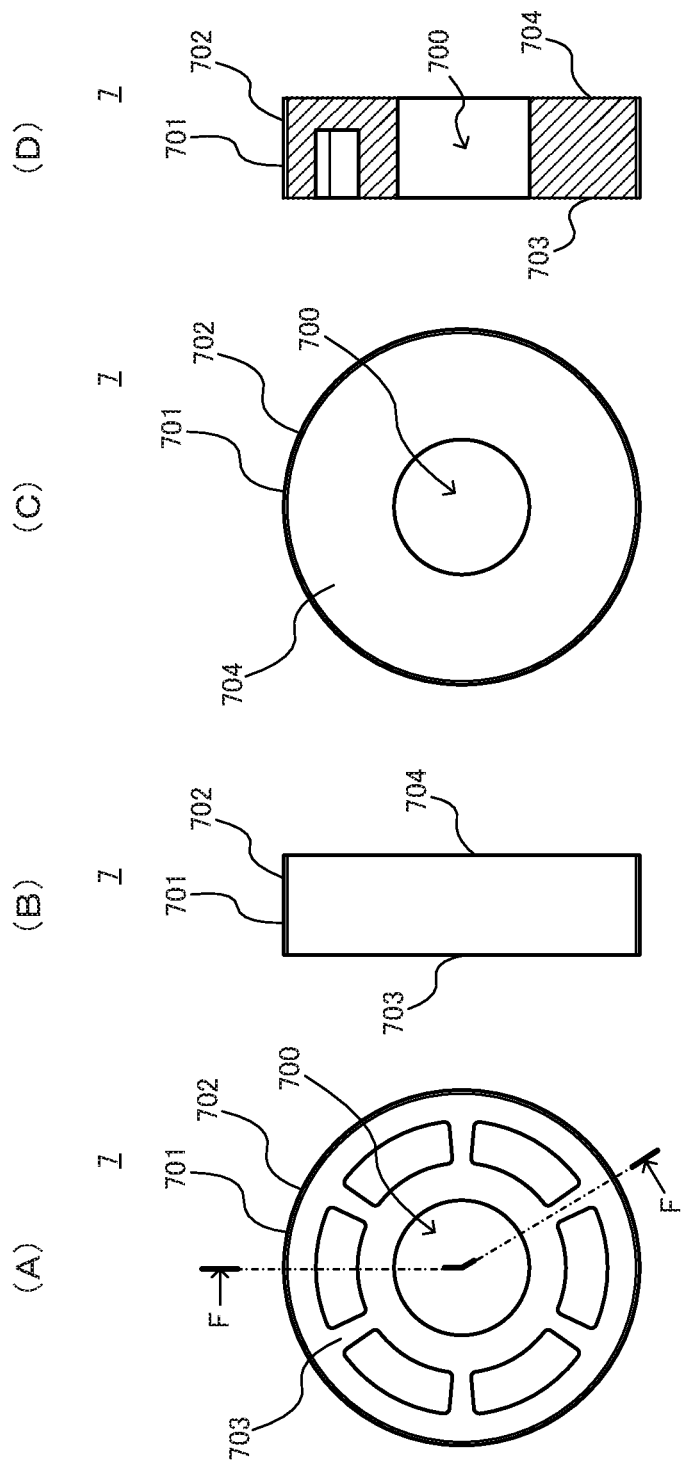
FIGS. 8(A)-8(C) are respectively a front view, a side view, and a back view of a lid 7.
FIG. 8(D) is an F-F cross-section view of the lid 7 shown in FIG. 8(A)

Further, in the bottom 201 of the cylindrical chamber 200, an opening part 202 for the rotor 5 is formed. By inserting the lower end 503 (See FIG. 7) of the below-mentioned rotor body 500 into this opening part 202, the rotor 5 is received in the cylindrical chamber 200 such that a rotation axis 520 of the rotor 5 coincides with the center line 220 of the cylindrical chamber 200 and the rotor 5 can rotate relative to the case 2 (See FIGS. 1 and 2). On the opening side 206 of the inner peripheral surface 203 of the cylindrical chamber 200, a female screw portion 207, which is screwed onto the below-mentioned male screw portion 702 (See FIG. 8) of the lid 7, is formed.

Each partitioning part 3 is a fan-shaped columnar member whose outer peripheral surface 300 is in contact with the inner peripheral surface 203 of the cylindrical chamber 200 of the case 2 and whose inner peripheral surface 301 is close to the outer peripheral surface 504 (See FIG. 7) of the below-mentioned rotor body 500 of the rotor 5 received in the cylindrical chamber 200 of the case 2. The pair of partitioning parts 3 are arranged along the center line 220 of the cylindrical chamber 200 of the case 2 axisymmetrically with respect to the center line 220, with the inner peripheral surfaces 301 of the partitioning parts 3 being directed to inward in radial directions of the cylindrical chamber 200, so that the inside of the cylindrical chamber 200 is partitioned into two regions 216a and 216b (See FIG. 9(A)).

FIG. 4(A) is a front view of a partitioning part 3, FIG. 4(B) is a B-B cross-section view of the partitioning part 3 shown in FIG. 4(A), FIG. 4(C) is a back view of the partitioning part 3, FIG. 4(D) is a C-C cross-section view (a top view of a partition block 30b) of the partitioning part 3 shown in FIG. 4(A), and FIG. 4(E) is a D-D cross-section view (a top view of a partition block 30a) of the partitioning part 3 shown in FIG. 4(A).

As shown in the figures, the partitioning part 3 is formed by stacking three partition blocks 30a-30c along the center line 220 of the cylindrical chamber 200 of the case 2. In the outer peripheral surface 300 of the partitioning part 3, a pair of positioning recesses 302 are formed for inserting the pair of positioning projections 204 of the case 2 corresponding to the partitioning part 3 in question.

In the partitioning part 3, the first flow path 303a and the second flow path 303b which pierce both the end surfaces 305 and 306 in the circumferential direction, are formed so as to connect the regions 216a and 216b (See FIG. 9(A)) partitioned by this partitioning part 3 in the cylindrical chamber 200 of the case 2. On the downstream side (on the side of the end surface 306 of the partitioning part 3) in a first rotation direction R1 (See FIG. 9) of the first flow path 303a, a stopper 307a for preventing falling of the first check valve 4a is formed. Similarly, on the downstream side (on the side of the end surface 305 of the partitioning part 3) in a second rotation direction R2 (See FIG. 10) of the second flow path 303b, a stopper 307b for preventing falling of the second check valve 4b is formed.

Further, in the partitioning part 3, a first insertion hole 304a for leading a screw portion 80 (See FIG. 2) of the first adjustment bolt 8a screwed into the first adjustment bolt screw hole 208a of the case 2 into the inside of the first flow path 303a is formed from the outer peripheral surface 300 of the partitioning part 3 toward the first flow path 303a. Here, in order that the viscous fluid 6 flowing in the first flow path 303a does not leak to the outside through the first insertion hole 304a, a seal member (not shown) such as an O-ring for closing the gap between the screw portion 80 of the first adjustment bolt 8a and the first insertion hole 304a may be put in the first insertion hole 304a.

Similarly, in the partitioning part 3, a second insertion hole 304b for leading a screw portion 80 (See FIG. 2) of the second adjustment bolt 8b screwed into the second adjustment bolt screw hole 208b of the case 2 into the inside of the second flow path 303b is formed from the outer peripheral surface 300 of the partitioning part 3 toward the second flow path 303b. Here, in order that the viscous fluid 6 flowing in the second flow path 303b does not leak to the outside through the second insertion hole 304b, a seal member (not shown) such as an O-ring for closing the gap between the screw portion 80 of the second adjustment bolt 8b and the second insertion hole 304b may be put in the second insertion hole 304b.

The first flow path 303a and the first insertion hole 304a are formed by stacking the partition blocks 30b and 30c, in such a manner that grooves formed in the upper surface of the partition block 30b and grooves formed in the lower surface of the partition block 30c are faced each other. Similarly, the second flow path 303b and the second insertion hole 304b are formed by stacking the partition blocks 30a and 30b, in such a manner that grooves formed in the upper surface of the partition block 30a and grooves formed in the lower surface of the partition block 30b are faced each other.

The partitioning part 3 of the above composition is contained in the cylindrical chamber 200 of the case 2, in a state that the first check valve 4a and the second check valve 4b are attached, for example in the following way. First, the pair of positioning projections 204 of the case 2 are inserted in the pair of the positioning recesses 302 of the partition block 30a, to position the partition block 30a on the bottom surface 203 of the cylindrical chamber 200 of the case 2. Thereafter, the second check valve 4b is placed on the side of the end surface 305 of the partitioning part 3, while the second check valve 4b is engaged with the stopper 307b of the second flow path 303b.

Next, the pair of positioning projections 204 of the case 2 are inserted in the pair of the positioning recesses 302 of the partition block 30b, to position the partition block 30b on the partition block 30c placed in the cylindrical chamber 200 of the case 2. Thereafter, the first check valve 4a is placed on the side of the end surface 306 of the partitioning part 3, while the first check valve is engaged with the stopper 307a of the first flow path 303a.

Then, the pair of positioning projections 204 of the case 2 are inserted in the pair of positioning recesses 302 of the partition block 30c, to position the partition block 30c on the partition block 30b placed in the cylindrical chamber 200 of the case 2. In this way, the partitioning part 3 attached with the first and second check valves 4a and 4b is made up.

Here, it is possible to provide screw holes running through the partition blocks 30a-30c and the bottom surface 203 of the cylindrical chamber 200 of the case 2, to fix the partition blocks 30a-30c to the case 2 by screwing connecting bolts into these screw holes.

The first check valve 4a opens and closes the first flow path 303a on the side of the end surface 306 of the partitioning part 3. Similarly, the second check valve 4b opens and closes the second flow path 303b on the side of the end surface 305 of the partitioning part 3.

FIGS. 5(A)-5(C) are respectively a front view, a top view, and a bottom view of each of the first check valves 4a and the second check valves 4b.

As shown in the figures, each of the first check valves 4a and the second check valves 4b comprises a disk-shaped valve part 400, an engaging part 401, and a cylindrical connecting part 402 connecting the valve part 400 and the engaging part 401.

The valve part 400 of the first check valve 4a has the diameter D5 larger than the diameter D1 (See FIG. 4(D)) of the opening of the first flow path 303a in the end surface 306 of the partitioning part 3 (the opening on the downstream side of the first flow path 303a in the first rotation direction R1). And the valve part 400 of the first check valve 4a opens and closes the opening of the first flow path 303a in the end surface 306 of the partitioning part 3, when the first check valve 4a moves. Similarly, the valve part 400 of the second check valve 4b has the diameter D5 larger than the diameter D3 of the diameter D3 (See FIG. 4(E)) of the opening of the second flow path 303b in the end surface 305 of the partitioning part 3 (the opening on the downstream side of the second flow path 303b in the second rotation direction R2). And the valve part 400 of the second check valve 4b opens and closes the opening of the second flow path 303b in the end surface 305 of the partitioning part 3, when the second check valve 4b moves.

The engaging part 401 of the first check valve 4a is a plate-like member whose length L1 is larger than the diameter D1 of the opening of the first flow path 303a in the end surface 306 of the partitioning part 3 and is smaller than the diameter D2 of the first flow path 303a, and whose width W is smaller than the diameter D1 of the opening of the first flow path 303a in the end surface 306 of the partitioning part 3. When the valve part 400 moves in the direction to open the opening of the first flow path 303a in the end surface 306 of the partitioning part 3, the engaging part 401 engages with the stopper 307a of the first flow path 303a, to prevent falling of the first check valve 4a from the first flow path 303a. Similarly, the engaging part 401 of the second check valve 4b is a plate-like member whose length L1 is larger than the diameter D3 of the opening of the second flow path 303b in the end surface 305 of the partitioning part 3 and is smaller than the diameter D4 of the second flow path 303b, and whose width W is smaller than the diameter D4 of the opening of the second flow path 303b in the end surface 305 of the partitioning part 3. When the valve part 400 moves in the direction to open the opening of the second flow path 303b in the end surface 305 of the partitioning part 3, the engaging part 401 engages with the stopper 307b of the second flow path 303b, to prevent falling of the second check valve 4b from the second flow path 303b.

The connecting part 402 of the first check valve 4a is a cylindrical member having a diameter D6 smaller than the diameter D1 of the opening of the first flow path 303a in the end surface 306 of the partitioning part 3. The length L2 of the connecting part 402 of the first check valve 4a is set so that the valve part 400 opens the first flow path 303a when the engaging part 401 engages with the stopper 307a of the first flow path 303a and the engaging part 401 can move freely without hitting against the side wall surface of the first flow path 303a when the valve part 400 closes the first flow path 303a. Similarly, the connecting part 402 of the second check valve 4b is a cylindrical member having a diameter D6 smaller than the diameter D3 of the opening of the second flow path 303b in the end surface 305 of the partitioning part 3. The length L2 of the connecting part 402 of the second check valve 4b is set so that the valve part 400 opens the second flow path 303b when the engaging part 401 engages with the stopper 307b of the second flow path 303b and the engaging part 401 can move freely without hitting against the side wall surface of the second flow path 303b when the valve part 400 closes the second flow path 303b.

The first check valve 4a of the above constitution is attached to the first flow path 303a in such a manner that the valve part 400 is positioned outside the end surface 306 of the partitioning part 3 and the engaging part 401 is positioned on the upstream side of the stopper 307a of the first flow path 303a in the first rotation direction R1 (See FIG. 9). Similarly, the second check valve 4b is attached to the second flow path 303b in such a manner that the valve part 400 is positioned outside the end surface 305 of the partitioning part 3 and the engaging part 401 is positioned on the upstream side of the stopper 307b of the second flow path 303b in the second rotation direction R2 (See FIG. 10).

A first adjustment bolt 8a is inserted into the first insertion hole 304a of the partitioning part 3 by screwing the first adjustment bolt 8a into the first adjustment bolt screw hole 208a concerned of the case 2. Similarly, a second adjustment bolt 8a is inserted into the second insertion hole 304b of the partitioning part 3 by screwing the second adjustment bolt 8b into the second adjustment bolt screw hole 208b concerned of the case 2.

Figure 6:
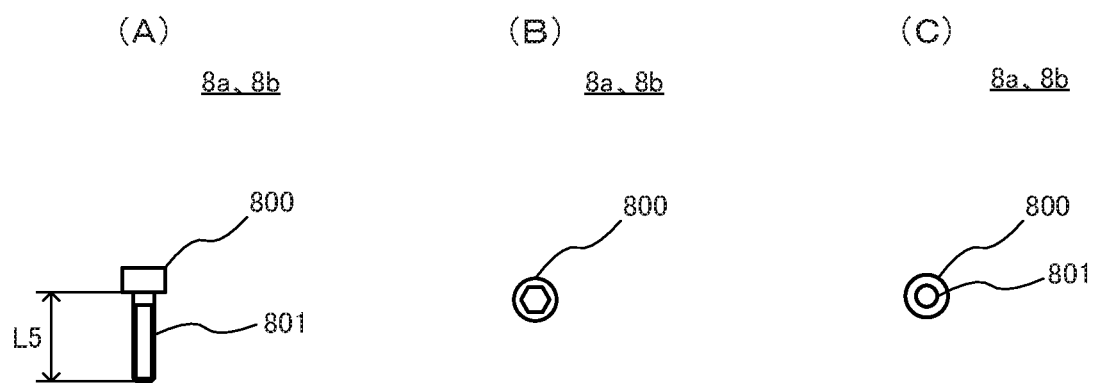
FIGS. 6(A)-6(C) are respectively a front view, a top view, and a bottom view of a first adjustment bolt 8a and a second adjustment bolt 8b.

FIGS. 6(A)-6(C) are respectively a front view, a top view, and a bottom view of the first adjustment bolt 8a and the second adjustment bolt 8b.

As shown in the figure, the first adjustment bolt 8a and the second adjustment bolt 8b each have a hexagon socket bolt head 800 and a screw portion 801.

The screw portion 801 of the first adjustment bolt 8a has the length L5 which is slightly shorter than the sum of the thickness T (See FIG. 2) between the outer peripheral surface 205 and the inner peripheral surface 203 of the case 2, the length L3 (See FIG. 4(D)) of the first insertion hole 304a, and the diameter D2 (See FIG. 4(D)) of the first flow path 303a, and is screwed into the first adjustment bolt screw hole 208a of the case 2. Similarly, the screw portion 801 of the second adjustment bolt 8b has the length L5 which is slightly shorter than the sum of the thickness T between the outer peripheral surface 205 and the inner peripheral surface 203 of the case 2, the length L4 (See FIG. 4(E)) of the second insertion hole 304b, and the diameter D4 (See FIG. 4(E)) of the second flow path 303b, and is screwed into the second adjustment bolt screw hole 208b of the case 2.

The rotor 5 is received in the cylindrical chamber 200 of the case 2 so as to be rotatable relative to the cylindrical chamber 200.

FIGS. 7(A) and 7(B) are respectively a front view and a side view of the rotor 5, and FIG. 7(C) is an E-E cross-section view of the rotor 5 shown in FIG. 7(A).

As shown in the figures, the rotor 5 comprises: the rotor body 500 of a cylindrical shape; and a pair of vanes (rotary wings) 501 formed axisymmetrically with respect to the rotation axis 520 of the rotor 5.

Each vane 501 is formed along the rotation axis 520 of the rotor 5 and protrudes outward in the radial direction from the outer peripheral surface 504 of the rotor body 500, to partition the cylindrical chamber 200, with the end surface of the vane 501 being positioned close to the inner peripheral surface 203 of the cylindrical chamber 200 of the case 2. As needed, a sliding member 508 is attached to the vane 501 (See FIGS. 1 and 2), to function as a seal member closing the gap between the end surface 505 of the vane 501 and the inner peripheral surface 203 of the cylindrical chamber 200, the gap between the lower surface 506 of the vane 501 and the bottom 201 of the cylindrical chamber 200, and the gap between the upper surface 507 of the vane 501 and the lower surface 704 (See FIG. 8) of the lid 7. As the material of the sliding member 508, resin which is superior in sliding property, such as polyamide, is used.

In the rotor body 500, a through-hole 509 for inserting a hexagon shaft (not shown), which transmits rotating force from the outside to the rotor 5, is formed centering at the rotation axis 520. The upper end 502 of the rotor body 500 is rotatably inserted into an opening part 700 (See FIG. 8) of the lid 7. The lower end 503 of the rotor body 500 is rotatably inserted into the opening part 202 formed in the bottom 201 of the cylindrical chamber 200 of the case 2 (See FIG. 2).

To prevent leakage of the viscous fluid 6 from the opening part 202 of the cylindrical chamber 200 of the case 2 to the outside, a seal member (not shown) such as an O-ring may be placed between the lower end 503 of the rotor body 500 and the opening part 202 of the cylindrical chamber 200 of the case 2.

The lid 7 confines the pair of partitioning parts 3, each of which is attached with the first check valve 4a and the second check valve 4b, and the rotor 5 together with the viscous fluid 6 in the case 2.

FIGS. 8(A)-8(C) are respectively a front view, a side view, and a back view of the lid 7, and FIG. 8(D) is an F-F cross-section view of the lid 7 shown in FIG. 8(A).

As shown in the figures, the opening part 700 piercing the upper surface 703 and the lower surface 704 of the lid 7 is formed in the lid 7 at the position to be opposed to the opening part 202 formed in the bottom 201 of the cylindrical chamber 200 of the case 2. The upper end 502 of the rotor body 500 of the rotor 5 is inserted into this opening part 700. Further, in the outer peripheral surface 701 of the lid 7, a male screw portion 702 is formed to screw into the female screw portion 207 formed on the opening side 206 of the inner peripheral surface 203 of the cylindrical chamber 200 of the case 2. To prevent leakage of the viscous fluid 6 from the opening part 700 of the lid 7 to the outside, a seal member (not shown) such as an O-ring may be placed between the upper end 502 of the rotor body 500 of the rotor 5 and the opening part 700 of the lid 7. Similarly, to prevent leakage of the viscous fluid 6 to the outside from the screw-coupling portion between the male screw portion 702 of the lid 7 and the female screw portion 207 of the cylindrical chamber 200 of the case 2, a seal member (not shown) such as an O-ring may be placed between the outer peripheral surface 701 of the lid 7 and the inner peripheral surface 203 of the cylindrical chamber 200 of the case 2.

Next, the operating principle of the rotary damper 1 will be described.

FIGS. 9(A) and 9(B) are views for explaining the operating principle when the rotary damper 1 rotates in the first rotation direction R1, and FIGS. 10(A) and 10(B) are views for explaining the operating principle when the rotary damper 1 rotates in the second rotation direction R2.

First, as shown in FIGS. 9(A) and 9(B), in the case that the rotor 5 rotates relative to the case 2 in the first rotation direction R1, a region 217 between each vane 501 of the rotor 5 and the end surfaces 305 positioned on the upstream side in the first rotation direction R1 of the partitioning part 3 concerned is compressed.

As a result, as shown in FIG. 9(A), the viscous fluid 6 in the region 217 flows into the first flow path 303a. By the force of the viscous fluid 6 that flowed into the first flow path 303a, the first check valve 4a opens the first flow path 303a. Accordingly, the viscous fluid 6 that flowed from the region 217 into the first flow path 303a is discharged to a region 218 between the other vane 501 of the rotor 5 and the end surface 306 positioned on the downstream side in the first rotation direction R1 of the partitioning part 3. This generates braking torque depending on the flow rate of the viscous fluid 6 flowing in the first flow path 303a against the rotating force applied to the rotor 5 in the first rotation direction R1. At that time, the flow rate of the viscous fluid 6 flowing in the first flow path 303a can be regulated according to the length of protrusion of the first adjustment bolt 8a into the first flow path 303a. Therefore, it is possible to adjust the braking torque against the rotating force applied to the rotor 5 in the first rotation direction R1 by changing the protrusion length of the first adjustment bolt 8a into the first flow path 303a. In detail, when it is desired to increase the braking torque, the protrusion length of the first adjustment bolt 8a into the first flow path 303a is increased so as to decrease the flow rate of the viscous fluid 6 flowing in the first flow path 303a. When it is desired to decrease the braking torque, the protrusion length of the first adjustment bolt 8a into the first flow path 303a is decreased so as to increase the flow rate of the viscous fluid 6 flowing in the first flow path 303a.

Here, when the rotor 5 rotates relative to the case 2 in the first rotation direction R1 and the region 217 between the vane 501 of the rotor 5 and the end surface 305 positioned on the upstream side in the first rotation direction R1 of the partitioning part 3 is compressed, the second check valve 4b closes the second flow path 303b by the pressure of the viscous fluid 6 in this region 217, as shown in FIG. 9(B). Therefore, the viscous fluid 6 does not move from the region 217 to the region 218 through the second flow path 303b.

Next, as shown in FIGS. 10(A) and 10(B), when the rotor 5 rotates relative to the case 2 in the second rotation direction R2 reverse to the first rotation direction R1, a region 218 between each vane 501 of the rotor 5 and the end surface 306 positioned on the upstream side in the second rotation direction R2 of the partitioning part 3 concerned is compressed.

As a result, as shown in FIG. 10(B), the viscous fluid 6 in the region 218 flows into the second flow path 303b. By the force of the viscous fluid 6 that flowed into the second flow path 303b, the second check valve 4b opens the second flow path 303b. Accordingly, the viscous fluid 6 that flowed from the region 218 into the second flow path 303b is discharged to a region 217 between the other vane 501 of the rotor 5 and the end surface 305 positioned on the downstream side in the second rotation direction R2 of the partitioning part 3. This generates braking torque depending on the flow rate of the viscous fluid 6 flowing in the second flow path 303b against the rotating force applied to the rotor 5 in the second rotation direction R2. At that time, the flow rate of the viscous fluid 6 flowing in the second flow path 303b can be regulated according to the length of protrusion of the second adjustment bolt 8b into the second flow path 303b. Therefore, it is possible to adjust the braking torque against the rotating force applied to the rotor 5 in the second rotation direction R2 by changing the protrusion length of the second adjustment bolt 8b into the second flow path 303b. In detail, when it is desired to increase the braking torque, the protrusion length of the second adjustment bolt 8b into the second flow path 303b is increased so as to decrease the flow rate of the viscous fluid 6 flowing in the second flow path 303b. When it is desired to decrease the braking torque, the protrusion length of the second adjustment bolt 8b into the second flow path 303b is decreased so as to increase the flow rate of the viscous fluid 6 flowing in the second flow path 303b.

Here, when the rotor 5 rotates relative to the case 2 in the second rotation direction R2, the region 218 between the vane 501 of the rotor 5 and the end surface 306 positioned on the upstream side in the second rotation direction R2 of the partitioning part 3 is compressed, the first check valve 4a closes the first flow path 303a by the pressure of the viscous fluid 6 in the region 218, as shown in FIG. 10(A). Therefore, the viscous fluid 6 does not move from the region 218 to the region 217 through the first flow path 303a.

Hereinabove, one embodiment of the present invention has been described.

In the present embodiment, the first flow path 303a and the second flow path 303b are formed in the partitioning part 3 so as to connect the regions 216a and 216b partitioned by the partitioning part 3 in the cylindrical chamber 200 of the case 2. In addition, the first insertion hole 304a and the second insertion hole 304b are formed in the partitioning part 3. The first insertion hole 304a leads the first adjustment bolt 8a screwed into the first adjustment bolt screw hole 208a of the case 2 into the first flow path 303a, and the second insertion hole 304b leads the second adjustment bolt 8b screwed into the second adjustment bolt screw hole 208b of the case 2 into the second flow path 303b.

Further, the present embodiment provides: the first check valve 4a which opens the first flow path 303a when the rotor 5 rotates relative to the case 2 in the first rotation direction R1 and closes the first flow path 303a when the rotor 5 rotates relative to the case 2 in the second rotation direction R2; the second check valve 4b which closes the second flow path 303b when the rotor 5 rotates relative to the case 2 in the first rotation direction R1 and opens the second flow path 303b when the rotor 5 rotates relative to the case 2 in the second rotation direction R2; the first adjustment bolt 8a which is screwed into the first adjustment bolt screw hole 208a of the case 2, to be inserted into the first insertion hole 304a of the partitioning part 3; and the second adjustment bolt 8b which is screwed into the second adjustment bolt screw hole 208b of the case 2, to be inserted into the second insertion hole 304b of the partitioning part 3.

According to this arrangement, in the present embodiment, it is possible to adjust movement of the viscous fluid between the regions 216a and 216b in the cylindrical chamber 200 of the case 2 partitioned by the partitioning part 3, by adjusting the screwed length of the first adjustment bolt 8a into the first adjustment bolt screw hole 208a, to change the protrusion length of the first adjustment bolt 8a into the first flow path 303a, so as to adjust the flow rate of the viscous fluid 6 flowing in the first flow path 303a when the rotor 5 rotates relative to the case 2 in the first rotation direction R1 (here, the flow path 303b is closed by the second check valve 4b). Thus, according to the present embodiment, it is possible to adjust the braking torque against the rotating force applied to the rotor 5 in the first rotation direction R1.

Similarly, in the present embodiment, it is possible to adjust movement of the viscous fluid between the regions 216a and 216b in the cylindrical chamber 200 of the case 2 partitioned by the partitioning part 3, by adjusting the screwed length of the second adjustment bolt 8b into the second adjustment bolt screw hole 208b, to change the protrusion length of the second adjustment bolt 8b into the second flow path 303b, so as to adjust the flow rate of the viscous fluid 6 flowing in the second flow path 303b when the rotor 5 rotates relative to the case 2 in the second rotation direction R2 (here, the first flow path 303a is closed by the first check valve 4a). Thus, according to the present embodiment, it is possible to adjust the braking torque against the rotating force applied to the rotor 5 in the second rotation direction R2.

Further, according to the present embodiment, it is possible to adjust the flow rate of the viscous fluid 6 flowing in the first flow path 303a when the rotor 5 rotates relative to the case 2 in the first rotation direction R1, only by adjusting the screwed length of the first adjustment bolt 8a into the first adjustment bolt screw hole 208a. Thus, the braking torque against the rotating force applied to the rotor 5 in the first rotation direction R1 can be adjusted by simple operation.

Similarly, according to the present embodiment, it is possible to adjust the flow rate of the viscous fluid 6 flowing in the second flow path 303b when the rotor 5 rotates relative to the case 2 in the second rotation direction R2, only by adjusting the screwed length of the second adjustment bolt 8b into the second adjustment bolt screw hole 208b. Thus, the braking torque against the rotating force applied to the rotor 5 in the second rotation direction R2 can be adjusted by simple operation.

Further, in the present embodiment, each partitioning part 3 is formed by stacking three partition blocks 30a-30c along the centerline 220 of the cylindrical chamber 200 of the case 2. Further, the first flow path 303a and the first insertion hole 304a are formed by stacking the partition blocks 30b and 30c in such a manner that the grooves formed in the upper surface of the partition block 30b are opposed to the respective grooves formed in the lower surface of the partition block 30c. Also, the second flow path 303b and the second insertion hole 304b are formed by stacking the partition blocks 30a and 30b in such a manner that the grooves formed in the upper surface of the partition block 30a are opposed to the respective grooves formed in the lower surface of the partition block 30b. Thus, according to the present embodiment, it is possible to provide the first flow path 303a and the first insertion hole 304a and the second flow path 303b and the second insertion hole 304b in the partitioning part 3, overlapping with each other along the center line 220 of the cylindrical chamber 200. Accordingly, it is possible to decrease the outer diameter of the partitioning part 3, to downsize the rotary damper 1.

Further, in the present embodiment, each vane 501 of the rotor 5 is attached with the sliding member 508 that functions as a seal member closing the gap between the end surface 505 of the vane 501 and the inner peripheral surface 203 of the cylindrical chamber 200, the gap between the lower surface 506 of the vane 501 and the bottom 201 of the cylindrical chamber 200, and the gap between the upper surface 507 of the vane 501 and the lower surface 704 of the lid 7, so that the slidability is improved while closing these gaps. Accordingly, it is possible to realize higher braking torque against the rotating force applied to the rotor 5, while smoothly rotating the hexagon shaft for transmitting the rotating force from the outside to the rotor 5.

The present invention is not limited to the above-described embodiment, and can be varied variously within the scope of the invention.

For example, in the above embodiment, one of the first adjustment bolt 8a and the second adjustment bolt 8b can be omitted.

In the case that the first adjustment bolt 8a is omitted, the first adjustment bolt screw hole 208a of the case 2 and the first insertion hole 304a of the partitioning part 3 are not necessary. In this case, it is possible to realize a rotary damper 1 which generates the braking torque whose magnitude is adjusted by the second adjustment bolt 8b against the rotating force applied to the rotor 5 in the second rotation direction R2, while generates smaller braking torque against the rotating force applied to the rotor 5 in the first rotation direction R1.

In the case that the first adjustment bolt screw hole 208a and the first insertion hole 304a are omitted, the respective grooves in the upper surface of the partition block 30b and in the lower surface of the partition block 30c may be omitted and the partition blocks 30b and 30c may be unified. Further, the partitioning part 3 may be formed integrally with the case 2, and the second flow path 303b and the second insertion hole 304b may be formed in the upper surface of the partitioning part 3.

In the case that the second adjustment bolt 8b is omitted, the second adjustment bolt screw hole 208b of the case 2 and the second insertion hole 304b of the partitioning part 3 are not necessary. In this case, it is possible to realize a rotary damper 1 which generates the braking torque whose magnitude is adjusted by the first adjustment bolt 8a against the rotating force applied to the rotor 5 in the first rotation direction R1, while generates smaller braking torque against the rotating force applied to the rotor 5 in the second rotation direction R2.

In the case that the second adjustment bolt screw hole 208b and the second insertion hole 304b are omitted, the respective grooves in the upper surface of the partition block 30a and in the lower surface of the partition block 30b may be omitted and the partition blocks 30a and 30b may be unified. Further, the partitioning part 3 may be formed integrally with the case 2, and the first flow path 303a and the first insertion hole 304b may be formed in the upper surface of the partitioning part 3.

Or, in the present embodiment, one of the first flow path 303a and the second flow path 303b can be omitted.

In the case that the first flow path 303a is omitted, the first adjustment bolt screw hole 208a of the case 2, the first insertion hole 304a of the partitioning part 3, and the first adjustment bolt 8a are omitted also. In this case, it is possible to realize a rotary damper 1 which generates the braking torque whose magnitude is adjusted by the second adjustment bolt 8b against the rotating force applied to the rotor 5 in the second rotation direction R2, while generates larger braking torque against the rotating force applied to the rotor 5 in the first rotation direction R1, with the second check valve 4b closing the second flow path 303b. Here, by further omitting the second check valve 4b also, it is possible to realize a rotary damper 1 that generates the braking torque whose magnitude is adjusted by the second adjustment bolt 8b when the rotating force is applied to the rotor 5 either in the first rotation direction R1 or in the second rotation direction R2.

Further, in the case that the second flow path 303b is omitted, the second adjustment bolt screw hole 208b of the case 2, the second insertion hole 304b of the partitioning part 3, and the second adjustment bolt 8a are omitted also. In this case, it is possible to realize a rotary damper 1 which generates the braking torque whose magnitude is adjusted by the first adjustment bolt 8a against the rotating force applied to the rotor 5 in the first rotation direction R1, while generates larger braking torque against the rotating force applied to the rotor 5 in the second rotation direction R2, with the first check valve 4a closing the first flow path 303b. Here, by further omitting the first check valve 4a also, it is possible to realize a rotary damper 1 that generates the braking torque whose magnitude is adjusted by the first adjustment bolt 8a when the rotating force is applied to the rotor 5 either in the first rotation direction R1 or in the second rotation direction R2.

In the above embodiment, the flow rate of the viscous fluid 6 flowing in the first flow path 303a is adjusted by operating the screwed length of the first adjustment bolt 8a into the first adjustment bolt screw hole 208a of the case 2. However, the present invention is not limited to this. An adjustment means other than a screw can be used as far as the flow rate of the viscous fluid 6 flowing in the first flow path 303a can be adjusted by adjusting the protrusion length from the outside into the first flow path 303a. Similarly, in the above embodiment, the flow rate of the viscous fluid 6 flowing in the second flow path 303b is adjusted by operating the screwed length of the second adjustment bolt 8b into the second adjustment bolt screw hole 208b. However, the present invention is not limited to this. An adjustment means other than a screw can be used as far as the flow rate of the viscous fluid 6 flowing in the second flow path 303b can be adjusted by adjusting the protrusion length from the outside into the second flow path 303b.

The above embodiment has been described taking the example where the pair of partitioning parts 3 are provided in the cylindrical chamber 200 of the case 2 and the rotor 5 is provided with the pair of vanes 501. However, the present invention is not limited to this. One, three, or more partitioning parts 3 and one, three, or more vanes 501 may be formed as far as the number of the partitioning parts 3 and the number of the vanes 501 are same.

The rotary damper 1 according to the above embodiment can be widely applied to a seat that has a reclining function and is used, for example, in an automobile, a railroad vehicle, an airplane, a ship, or the like.

REFERENCE SIGNS LIST

1: rotary damper; 2: case; 3: partitioning part; 4a: first check valve; 4b: second check valve; 5: rotor; 6: viscous fluid; 7: lid; 8a: first adjustment bolt; 8b: second adjustment bolt; 30a-30c: partition block; 200: cylindrical chamber; 201: bottom of the cylindrical chamber 200; 202: opening part of the cylindrical chamber 200; 203: inner peripheral surface of the cylindrical chamber; 204: positioning projection of the cylindrical chamber 200; 205: outer peripheral surface of the cylindrical chamber; 206: opening side of the cylindrical chamber 200; 207: female screw portion of the cylindrical chamber 200; 208a: first adjustment bolt screw hole; 208b: second adjustment bolt screw hole; 220: center line of the cylindrical chamber 200; 300: outer peripheral surface of the partitioning part 3; 301: inner peripheral surface of the partitioning part 3; 302: positioning recess of the partitioning part 3; 303a: first flow path; 303b: second flow path; 304a: first insertion hole; 304b: second insertion hole; 305, 306: end surface of the partitioning part 3; 307a: stopper of the first flow path 303a; 307b: stopper of the second flow path; 400: valve part; 401: engaging part; 402: connecting part; 500: rotor body; 501: vane; 502: upper end of the rotor body 500; 503: lower end of the rotor body 500; 504: outer peripheral surface of the rotor body 500; 505: end surface of the vane 501; 506: lower surface of the vane 501; 507: upper surface of the vane 501; 508: seal member; 509: through-hole of the rotor body 500; 520: rotation axis of the rotor 5; 700: opening part of the lid 7; 701: outer peripheral surface of the lid 7; 702: male screw portion of the lid 7; 703: upper surface of the lid 7; 704: lower surface of the lid 7; 800: hexagon socket bolt head; and 800: screw portion.

The invention claimed is:

1. A rotary damper for generating braking torque against applied rotating force by limiting movement of viscous fluid, comprising:
  a case which has: a cylindrical chamber filled with the viscous fluid; and a fan-shaped partitioning part provided along a center line of the cylindrical chamber, with an inner peripheral surface of the partitioning part being directed inward in a radial direction, to partition an inside of the cylindrical chamber;
  a rotor which has: a rotor body received in the cylindrical chamber rotatably relative to the cylindrical chamber, so that an outer peripheral surface of the rotor body is close to the inner peripheral surface of the partitioning part; and a vane formed along the center line of the cylindrical chamber, to protrude outward in a radial direction from an outer peripheral surface of the rotor body, so that an end surface of the vane is close to an inner peripheral surface of the cylindrical chamber;

a lid which is fixed to an opening part of the cylindrical chamber, to confine the rotor together with the viscous fluid in the cylindrical chamber;

a first flow path which is provided in the partitioning part and connects regions in the cylindrical chamber partitioned by the partitioning part;

a first insertion hole which pierces a side wall of the first flow path and an outer peripheral surface of the case; and a first adjustment means which is inserted into the first insertion hole and can change a protrusion length into the first flow path while closing the first insertion hole, wherein:

the rotary damper comprises at least two partition blocks stacked along the center line of the cylindrical chamber; and the first flow path and the first insertion hole are each made up of grooves formed in respective opposed surfaces of two partition blocks adjacent to each other in a height direction among the at least two partition blocks.

2. A rotary damper of claim 1, wherein:
the first adjustment means is an adjustment screw that is screwed into a screw hole working as the first insertion hole.

3. A rotary damper for generating braking torque against applied rotating force by limiting movement of viscous fluid, comprising:

a case which has: a cylindrical chamber filled with the viscous fluid; and a fan-shaped partitioning part provided along a center line of the cylindrical chamber, with an inner peripheral surface of the partitioning part being directed inward in a radial direction, to partition an inside of the cylindrical chamber;

a rotor which has: a rotor body received in the cylindrical chamber rotatably relative to the cylindrical chamber, so that an outer peripheral surface of the rotor body is close to the inner peripheral surface of the partitioning part; and a vane formed along the center line of the cylindrical chamber, to protrude outward in a radial direction from an outer peripheral surface of the rotor body, so that an end surface of the vane is close to an inner peripheral surface of the cylindrical chamber;

a lid which is fixed to an opening part of the cylindrical chamber, to confine the rotor together with the viscous fluid in the cylindrical chamber;

a first flow path which is provided in the partitioning part and connects regions in the cylindrical chamber partitioned by the partitioning part;

a first insertion hole which pierces a side wall of the first flow path and an outer peripheral surface of the case;

a first adjustment means which is inserted into the first insertion hole and can change a protrusion length into the first flow path while closing the first insertion hole; and a first check valve which opens the first flow path when the rotor rotates relative to the cylindrical chamber in a first rotation direction, and closes the first flow path when the rotor rotates relative to the cylindrical chamber in a second rotation direction reverse to the first rotation direction, wherein:

the rotary damper comprises at least two partition blocks stacked along the center line of the cylindrical chamber; and the first flow path and the first insertion hole are each made up of grooves formed in respective opposed surfaces of two partition blocks adjacent to each other in a height direction among the at least two partition blocks.

4. A rotary damper of claim 3, wherein:
the first adjustment means is an adjustment screw that is screwed into a screw hole working as the first insertion hole.

5. A rotary damper for generating braking torque against applied rotating force by limiting movement of viscous fluid, comprising:

a case which has: a cylindrical chamber filled with the viscous fluid; and a fan-shaped partitioning part provided along a center line of the cylindrical chamber, with an inner peripheral surface of the partitioning part being directed inward in a radial direction, to partition an inside of the cylindrical chamber;

a rotor which has: a rotor body received in the cylindrical chamber rotatably relative to the cylindrical chamber, so that an outer peripheral surface of the rotor body is close to the inner peripheral surface of the partitioning part; and a vane formed along the center line of the cylindrical chamber, to protrude outward in a radial direction from an outer peripheral surface of the rotor body, so that an end surface of the vane is close to an inner peripheral surface of the cylindrical chamber;

a lid which is fixed to an opening part of the cylindrical chamber, to confine the rotor together with the viscous fluid in the cylindrical chamber;

a first flow path which is provided in the partitioning part and connects regions in the cylindrical chamber partitioned by the partitioning part;

a first insertion hole which pierces a side wall of the first flow path and an outer peripheral surface of the case;

a first adjustment means which is inserted into the first insertion hole and can change a protrusion length into the first flow path while closing the first insertion hole;

a second flow path which is provided in the partitioning part and connects the regions in the cylindrical chamber partitioned by the partitioning part;

a second check valve which closes the second flow path when the rotor rotates relative to the cylindrical chamber in the first rotation direction, and opens the second flow path when the rotor rotates relative to the cylindrical chamber in the second rotation direction;

a second insertion hole which pierces a side wall of the second flow path and the outer peripheral surface of the case; and a second adjustment means which is inserted into the second insertion hole and can change a protrusion length into the second flow path while closing the second insertion hole, wherein:

the partitioning part comprises at least three partition blocks stacked along the center line of the cylindrical chamber;

the first flow path and the first insertion hole are each made up of grooves formed in respective opposed surfaces of two partition blocks adjacent to each other in a height direction among the at least three partition blocks;

the second flow path and the second insertion hole are each made up of grooves formed in respective opposed surfaces of two partition blocks adjacent to each other in a height direction, at least one of which is not one of the partition blocks in which the grooves making up the first flow path and the first insertion hole are formed, among the at least three partition blocks.

6. A rotary damper of claim 5, wherein:
the second adjustment means is an adjustment screw that is screwed into a screw hole working as the second insertion hole.

7. A rotary damper of claim 6, wherein:
the first adjustment means is an adjustment screw that is screwed into a screw hole working as the first insertion hole.

8. A rotary damper of claim 5, wherein:
the first adjustment means is an adjustment screw that is screwed into a screw hole working as the first insertion hole.

\* \* \* \* \*